United States Patent
Hegler

(10) Patent No.: US 10,583,596 B2
(45) Date of Patent: Mar. 10, 2020

(54) INJECTION HEAD FOR AN APPARATUS FOR THE PRODUCTION OF A TWIN-WALL PIPE

(71) Applicant: Ralph Peter Hegler, Bad Kissingen (DE)

(72) Inventor: Ralph Peter Hegler, Bad Kissingen (DE)

(*) Notice: Subject to any disclaimer, the term of this patent is extended or adjusted under 35 U.S.C. 154(b) by 660 days.

(21) Appl. No.: 15/287,009

(22) Filed: Oct. 6, 2016

(65) Prior Publication Data

US 2017/0095957 A1   Apr. 6, 2017

(30) Foreign Application Priority Data

Oct. 6, 2015   (DE) .................. 10 2015 219 221

(51) Int. Cl.
*B29C 45/16* (2006.01)
*B29C 48/30* (2019.01)
(Continued)

(52) U.S. Cl.
CPC .......... *B29C 45/1603* (2013.01); *B29C 45/20* (2013.01); *B29C 45/7207* (2013.01); *B29C 48/09* (2019.02); *B29C 48/13* (2019.02); *B29C 48/18* (2019.02); *B29C 48/302* (2019.02); *B29C 48/303* (2019.02); *B29C 48/325* (2019.02); *B29C 49/0021* (2013.01); (Continued)

(58) Field of Classification Search
CPC . B29C 45/1603; B29C 45/20; B29C 45/7207; B29C 49/0021; B29C 53/30; B29C 2947/92647; B29C 2948/92647; B29C 47/0023; B29C 47/0033; B29C 47/06; B29C 47/124; B29C 47/126; B29C 47/22; B29C 47/261; B29C 47/92; B29C 48/09; B29C 48/13; B29C 48/18; B29C 48/30; B29C 48/302; B29C 48/303; B29C 48/325; B29C 48/336; B29C 48/92; B29L 2009/00; B29L 2023/22
USPC ....................... 425/542, 133.1, 381
See application file for complete search history.

(56) References Cited

U.S. PATENT DOCUMENTS 5,320,797 A    6/1994 Hegler
5,346,384 A *  9/1994 Hegler .................... B29C 48/30
                                                425/381
(Continued)

FOREIGN PATENT DOCUMENTS

DE    19724113 A1   12/1998
EP    0563575 A2   10/1993
(Continued)

*Primary Examiner* — Matthew J Daniels
*Assistant Examiner* — Yunju Kim
(74) *Attorney, Agent, or Firm* — Browdy and Neimark, PLLC

(57) ABSTRACT

An injection head for an apparatus for the production of twin-wall pipes has an external melt channel leading to an external nozzle and an internal melt channel leading to an internal nozzle. From the internal melt channel, a conically expanding internal nozzle channel leads to an internal nozzle outlet of the internal nozzle. In the region of the internal nozzle channel, an internal nozzle adjustment device is arranged by means of which the gap cross-section of the internal nozzle channel is displaceable and adjustable up to the internal nozzle outlet by radial displacement.

10 Claims, 3 Drawing Sheets

(51) Int. Cl.
*B29C 48/18*      (2019.01)
*B29C 48/13*      (2019.01)
*B29C 48/325*     (2019.01)
*B29C 48/09*      (2019.01)
*B29C 49/00*      (2006.01)
*B29C 53/30*      (2006.01)
*B29C 45/72*      (2006.01)
*B29C 45/20*      (2006.01)
*B29C 48/92*      (2019.01)
*B29C 48/335*     (2019.01)
*B29L 9/00*       (2006.01)
*B29L 23/00*      (2006.01)

(52) U.S. Cl.
CPC .............. *B29C 53/30* (2013.01); *B29C 48/30* (2019.02); *B29C 48/336* (2019.02); *B29C 48/92* (2019.02); *B29C 2948/92647* (2019.02); *B29L 2009/00* (2013.01); *B29L 2023/22* (2013.01)

(56) References Cited

U.S. PATENT DOCUMENTS

| | | |
|---|---|---|
| 5,693,347 A | 12/1997 | Hegler |
| 5,992,469 A | 11/1999 | Hegler |
| 6,045,347 A | 4/2000 | Hegler |
| 6,382,944 B1 | 5/2002 | Guillemette |
| 8,794,978 B2 | 8/2014 | Hegler |
| 8,899,956 B2 | 12/2014 | Hegler |
| 2005/0106280 A1 | 5/2005 | Karr et al. |

FOREIGN PATENT DOCUMENTS

| | | |
|---|---|---|
| EP | 0764516 A2 | 3/1997 |
| EP | 0834386 B1 | 11/2001 |
| EP | 2116352 A1 | 11/2009 |
| EP | 2452803 A1 | 5/2012 |
| EP | 2589481 A1 | 5/2013 |
| WO | 99500416 A1 | 10/1999 |

\* cited by examiner

INJECTION HEAD FOR AN APPARATUS FOR THE PRODUCTION OF A TWIN-WALL PIPE

CROSS-REFERENCES TO RELATED APPLICATIONS

This application claims the priority of German Patent Application, Serial No. 10 2015 219 221.0, filed Oct. 6, 2015, pursuant to 35 U.S.C. 119(a)-(d), the content of which is incorporated herein by reference in its entirety as if fully set forth herein.

FIELD OF THE INVENTION

The invention relates to an injection head for an apparatus for the production of a twin-wall pipe consisting of a smooth internal pipe and an external pipe welded thereto and provided with corrugations, the injection head comprising
- an external melt channel extending concentrically to a centre longitudinal axis and leading to an external nozzle,
- an external nozzle casing delimiting the external melt channel on its side facing away from the centre longitudinal axis,
- an external nozzle channel leading from the external melt channel to an external nozzle outlet of the external nozzle, said external nozzle channel expanding conically,
- an external nozzle adjustment device for radial adjustment of the external nozzle,
- an internal melt channel extending concentrically to the centre longitudinal axis and leading to an internal nozzle,
- an internal nozzle casing delimiting the internal melt channel on its side facing away from the centre longitudinal axis,
- an internal nozzle channel leading from the internal melt channel to an internal nozzle outlet of the internal nozzle, the internal nozzle channel expanding conically and having an outside, and,
- an internal nozzle adjustment device for radial adjustment of the internal nozzle.

BACKGROUND OF THE INVENTION

In an injection head of this type, known from EP 0 834 386 A1, the internal nozzle adjustment device for the radial adjustment of the internal nozzle cross-section and the external nozzle adjustment device for the radial adjustment of the external nozzle cross-section are arranged at the end disposed outside a moulding machine, in other words a corrugator, thus allowing an adjustment to be performed during operation. Such radial nozzle adjustment devices are used to change the cross-section of a nozzle channel leading to the respective nozzle outlet of the internal nozzle or the external nozzle, respectively, via its periphery in such a way that the desired melt streams are distributed across the periphery in order to be guided to the actual respective nozzle outlet. Nozzle adjustment devices of this type, which are arranged relatively far away from the internal nozzle or the external nozzle, respectively, can be used for injection heads and corresponding moulding machines for producing twin-wall pipes having relatively small nominal widths.

From WO 99/50046 A1 and from EP 2 116 352 A1, it is known to provide various cross-section reductions distributed along the periphery of the melt channel by providing radial adjustments or deformations. This leads to considerable sealing problems and, therefore, to the risk of operational malfunctions.

In the case of injection heads for apparatuses for the production of twin-wall pipes having large nominal widths, in particular nominal widths great-er than DN 400, the external radial nozzle centering, in particular of the internal nozzles, have a major disadvantage as the injection heads and the individual components thereof are very heavy, with the result that the entire injection head may have a weight of several tons. This means that heavy injection head components including the viscous thermoplastic plastic melt in the internal melt channel need to be moved relative to each other along a relatively long path from outside, in other words by means of the respective nozzle adjustment device. This is possible only with a very high expenditure of force while requiring a complicated design so it is extremely impractical when producing twin-wall pipes having a large nominal width. This is particularly true for the internal nozzle adjustment device.

SUMMARY OF THE INVENTION

Therefore, the invention is based on an object of designing an injection head of the generic type in such a way as to reduce the effort necessary to adjust the radial gap of the internal nozzle.

In an injection head of the generic type, this object is attained by the internal nozzle adjustment device being arranged at the internal nozzle casing and delimiting the conically expanding internal nozzle channel at least partly on its outside. As the means for radial adjustment of the gap width of the internal nozzle channel are arranged in this region directly in front of and at the internal nozzle exit, the forces required for adjustment are re-duced. A fine-tuning can be performed easily; all that is necessary is to re-move the injection head from the actual molding machine. No other parts of the injection head need to be demounted.

An injection head, in which the external nozzle adjustment device is arranged at the external nozzle casing and delimits the conically expanding external nozzle channel at least partly on its outside, provides a solution comparable to the above mentioned solution, in which the internal nozzle adjustment device is arranged at the internal nozzle casing and delimits the conically expanding internal nozzle channel at least partly on its outside, with similar advantages for adjusting the gap width of the external nozzle channel.

The components of the internal nozzle, which are displaceable relative to each other, only have a relatively small axial extension in practical application, in other words only a minimum expenditure of force is necessary to move or adjust them. An internal nozzle adjustment device having an internal radial adjustment ring that is displaceable in a direction radial to the centre longitudinal axis and delimits the conically expanding internal nozzle channel at least partly on its outside, and an internal radial adjustment ring being radially displaceably arranged on an internal support ring, which is arranged on the internal nozzle casing, provide a simple embodiment to do so.

The further development, in which the internal radial adjustment ring and the internal support ring abut against each other in a sealing manner by means of faces extending radially to the centre longitudinal axis, ensures that the melt pressure in front of the internal nozzle channel increases the sealing pressure on the sliding faces during operation, with the result that a reliable sealing is achieved.

An internal radial adjustment ring being adjustable by means of a plurality of radial adjustment screws distributed across its periphery and arranged radially to the centre longitudinal axis, said radial adjustment screws abutting against a ring face of the internal support ring, an internal radial adjustment ring being firmly connectable to the internal support ring by means of internal fastening screws, and, on the internal radial adjustment ring, an internal axial adjustment ring being arranged that is displaceable and lockable in place by means of internal adjustment screws, with the internal radial adjustment ring delimiting the gap width of the internal nozzle channel in the region of the internal nozzle outlet, reflect advantageous further developments.

An external nozzle adjustment device having an external radial adjustment ring displaceable in the direction radial to the centre longitudinal axis, said radial adjustment ring delimiting the conically expanding external nozzle channel at least partly on its outside, an external radial adjustment ring being arranged on an external support ring in such a way as to be radially displaceable, said external support ring being arranged on the external nozzle casing, an external radial adjustment ring and the external support ring abutting against each other in a sealing manner by means of faces extending radially to the centre longitudinal axis, an external radial adjustment ring being adjustable by means of a plurality of external radial adjustment screws distributed across its periphery and arranged radially to the centre longitudinal axis, said radial adjustment screws abutting against a ring face of the external support ring, an external radial adjustment ring being firmly connectable to the external support ring by means of external fastening screws, on the external radial adjustment ring, an external axial adjustment ring being arranged that is displaceable and lockable in place by means of external axial adjustment screws, with the external radial adjustment ring delimiting the gap width of the external nozzle channel in the region of the external nozzle outlet, reflect the comparable embodiment of an external nozzle adjustment device according to the invention.

The internal nozzle adjustment device according to the invention can be used together with a conventional external nozzle adjustment device or together with the external nozzle adjustment device provided according to the invention as well.

Further details, advantages and features emerge from the following description of embodiments with the aid of the drawings.

DESCRIPTION OF THE PREFERRED EMBODIMENTS

Figure 1:
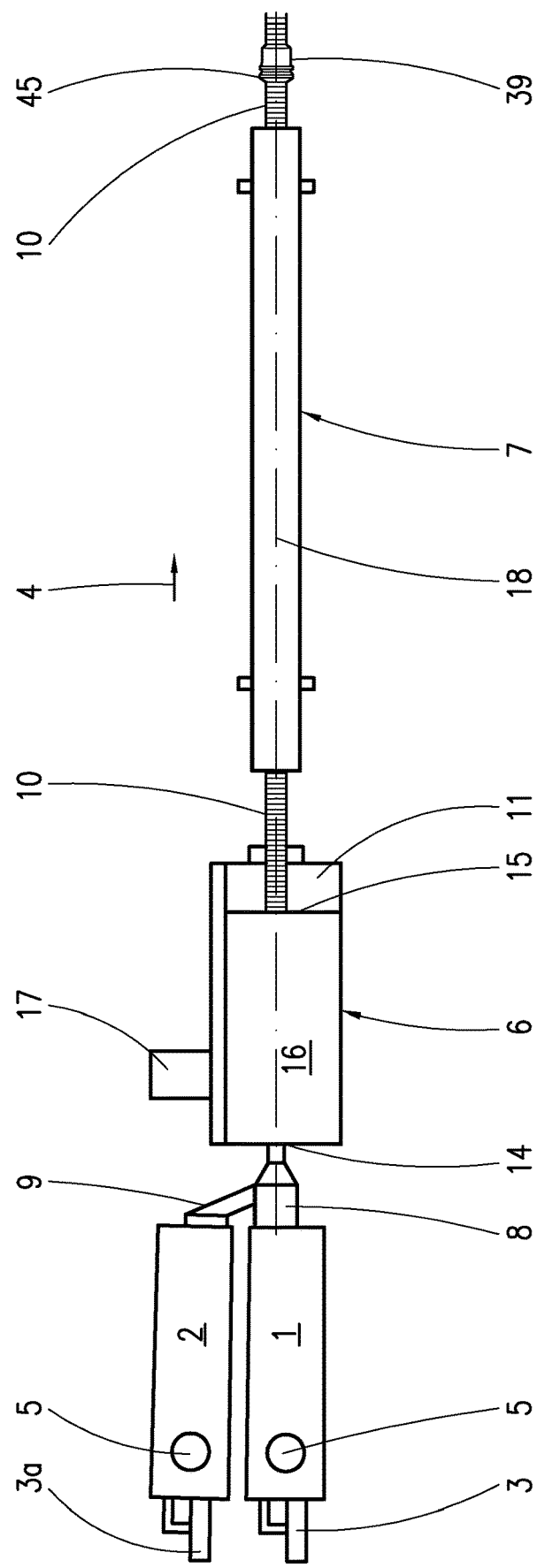
FIG. 1 shows a system, which substantially consists of two extruders, a corrugator and an additional cooling device, for producing twin wall pipes with integral sockets in a schematic plan view.

The system shown in FIG. 1 for producing twin wall pipes has two extruders 1, 2. These are in each case driven by a speed-controllable drive motor 3 or 3a, which—in relation to a conveying direction 4 of the entire system—is provided upstream in front of the supply hoppers 5 of the extruders 1, 2.

Downstream of the extruders 1, 2 in relation to the conveying direction 4, there is arranged a corrugator 6, a so-called corrugator, downstream of which is in turn arranged an additional cooling device 7. Attached to an extruder 1 arranged aligned with the corrugator 6 and the additional cooling device 7 is a cross pipe head 8, in other words an extrusion tool, which projects into the corrugator 6. The other extruder 2 arranged to the side of this extruder 1 is connected by an injection channel 9, which opens laterally into the cross pipe head 8, to the cross pipe head 8. As indicated schematically in FIG. 1, a twin wall pipe 10, which leaves the corrugator 6 in the conveying direction 4 and is cooled in the additional cooling device 7, is formed in the corrugator 6. Said twin wall pipe can then be cut into pieces of a suitable length behind this additional cooling device 7.

The structure of the corrugator 6 is known and conventional in practice. It is described, for example, in EP 0 563 575 B1 (corresponding to U.S. Pat. No. 5,320,797), to which reference is expressly made. It substantially has a machine table 11, on which the mould block halves 12, 12a are arranged. The mould block halves 12, 12a are joined on the machine table 11 in the conveying direction 4 to form a mold block pair 13, in each case, and guided from the upstream inlet end 14—in relation to the conveying direction 4—to the downstream outlet end 15, wherein mold block pairs 13 following behind one another in the conveying direction 4 in turn abut one another. The mould block halves 12, 12a guided together on a molding section 16 to form mold block pairs 13, in each case, are driven by means of a drive motor 17. The transportation of the mould block halves 12, 12a and the mold block pairs 13 on the machine table 11 is shown and described in detail in EP 0 764 516 B1 (corresponding to U.S. Pat. No. 5,693,347), to which reference may be made.

The cross pipe head 5 has two melt channels arranged concentrically with respect to a common centre longitudinal axis 18, namely an inner melt channel 19 and an external melt channel 20, which—in relation to the conveying direction 4—end downstream in an internal nozzle 21 or an external nozzle 22. The inner melt channel 19 is connected to an injection channel 23 of the extruder 1 arranged aligned with the corrugator 6, whereas the external melt channel 20 is connected to the injection channel 9 of the other extruder 2. An annular-cylindrical support air and venting channel 24, which is concentric with respect to the axis 18, opens out of the pipe head 8 between the internal nozzle 21 and the external nozzle 22. At the downstream end of the pipe head 8—in relation to the conveying direction 4—a calibrating mandrel 25 is attached thereon and also runs concentrically with respect to the axis 18.

The pipe head 8, in other words the extrusion tool, is multi-part in construction. The inner melt channel 19 is limited by an internal nozzle mandrel 26 and an internal nozzle casing 27. The external melt channel 20 is limited by an external nozzle mandrel 28 and an external nozzle casing 29, the description—in relation to the axis 18—having taken place from the inside to the outside. The support air and venting channel 24 is configured between the internal nozzle casing 27 and the external nozzle mandrel 28, and specifically as an annular-cylindrical channel 24, which is concentric with respect to the axis 18.

On the pipe head 8, in other words on its external nozzle casing 29, there is provided—in relation to the conveying direction 4—upstream of the external nozzle 22, a cylindrical external face 31, which is exchangeably attached and formed from two half shells, between which and the mould block halves 12, 12a, an annular sealing gap is formed. This configuration is shown and described in detail in EP 11 184 779.4 (corresponding to U.S. Pat. No. 8,899,956), to which reference is made.

The mould block halves 12, 12a have annular mould recesses 33, which are arranged one behind the other at regular intervals and which are, in each case, connected to partial vacuum channels 34. At the inlet of the mould block halves 12, 12a into the molding section 16, the partial vacuum channels 34 arrive at partial vacuum supply sources, not shown, shown and described in EP 11 184 779.4, so the mould recesses 33 are subjected to a partial vacuum.

The plastics material melt supplied from the extruder 2 through the injection channel 9 to the pipe head 8 flows through the external melt channel 20 to the external nozzle 22 and is extruded there while forming an external hose 35. Because of the partial vacuum and because of the support air supplied through the support air and venting channel 24, this external hose 35 is placed, while forming a tube configured with annular corrugations 36, in the mould recesses 33. Plastic material melt is supplied from the extruder 1 through the injection channel 23 to the cross pipe head 8 and flows through the inner melt channel 19 to the internal nozzle 21 and leaves from there as an internal hose 37, which arrives on the calibrating mandrel 25. The latter widens slightly outwardly from the internal nozzle 21 in the conveying direction 4, until the internal hose 37 arrives against the corrugation valleys 38 of the external hose 35 and is welded thereto here. The internal hose 37 and the external hose 35 form the twin wall pipe 10 after cooling while solidifying.

Figure 2:
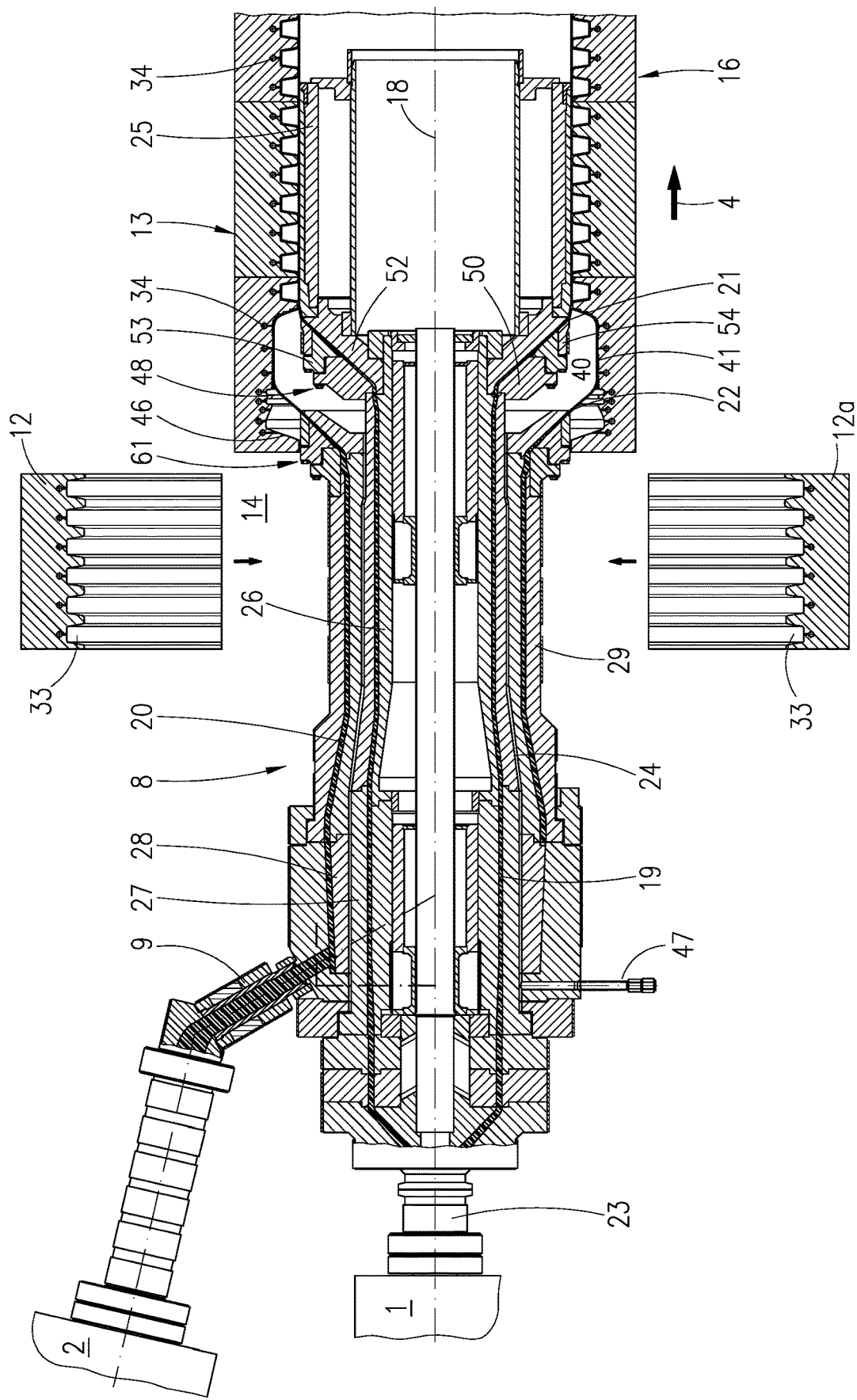
FIG. 2 shows a pipe head and the inlet end of the corrugator in a horizontal section.
Figure 3:
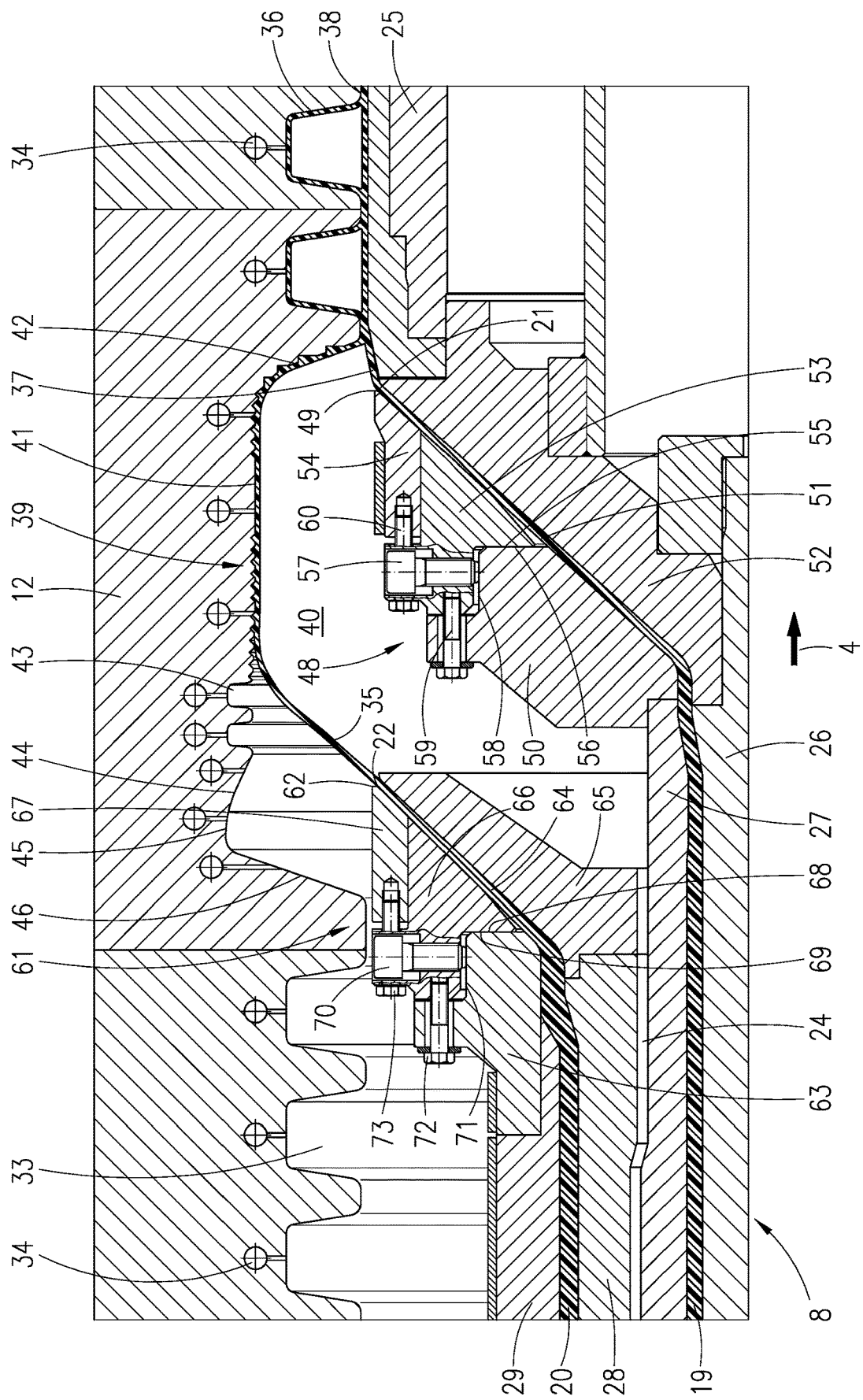
FIG. 3 shows a partial section from FIG. 2 to an enlarged scale compared with FIG. 2.

As can be seen, in particular from FIGS. 2 and 3, the mould block halves 12, 12a are formed in such a way that integral sockets 39 are in each case formed at predetermined intervals within the continuously produced twin wall pipe 10. For this purpose, a socket recess 40 is formed in a pair of mould block halves 12, 12a and thus has a substantially smooth, cylindrical wall 41. A transition face 42 is formed between the wall 41 of the socket recess 40 and the mould recess 33 upstream in the conveying direction 4. Adjoining the—in relation to the conveying direction 4—downstream end of the wall 41 of the socket recess 40 are peripheral grooves 43 to reinforce the integral socket 39 and a truncated cone-shaped molding portion 44, in which an outwardly widening introduction end 45 of the socket 39 is formed. A transition face 46 which leads to the next—downstream in the conveying direction 4—mould recess 33, in turn adjoins this.

The support air and venting channel 24 extends—as can be inferred from FIG. 2—over a substantial part of the extent of the pipe head 8 in the direction of the axis 18. In the region of the—in relation to the conveying direction 4—upstream end of the pipe head 8, a support air supply pipe 47 opens, as can be inferred, in particular, form FIGS. 2 and 4, into the support air and venting channel 24. Said support air supply pipe is connected by a support air line to a compressed air source.

As far as it has been described up to this point, the apparatus is known from EP 2 589 481 A1.

As can in particular be seen from FIG. 3, the internal nozzle 21 is adjustable, by means of an internal nozzle adjustment device 48, both in the direction of the centre longitudinal axis 18 and in a direction radial thereto, allowing the gap width of the internal nozzle 21 to be adjusted in the region of its internal nozzle outlet 49, and also with a gap width that is variable, in other words different, across the periphery of the internal nozzle outlet 49. To this end, an internal support ring 50 is immovably arranged on the internal nozzle casing 27, said support ring 50 delimiting the internal nozzle channel 51 adjoining the internal melt channel 19 in the shape of a truncated cone on the side facing radially away from the centre longitudinal axis 18, in other words to the outside. On its inside, the internal nozzle channel 51 is, starting from the internal melt channel 19 up to the internal nozzle outlet 49, delimited by a counter ring 52 having an outer surface in the shape of a truncated cone, said counter ring 52 being immovably attached to the internal nozzle mandrel 26.

On the internal support ring 50, an internal radial adjustment ring 53 is arranged, with an internal axial adjustment ring 54 being in turn arranged thereon. The internal radial adjustment ring 53 abuts, with a contact face 55 extending radially to the centre longitudinal axis 18, against a counter face 56, extending in the corresponding direction, of the internal support ring 50, thus allowing the internal radial adjustment ring 53 to be displaced on the internal support ring 50 in a direction radial to the centre longitudinal axis 18, thus allowing the gap width of the internal nozzle channel 51 to be adjusted to different extents in the region of the internal radial adjustment ring 53 via the periphery of the internal nozzle channel 51. An adjustment of this type is performed by means of a plurality of internal radial adjustment screws 57 distributed across the periphery, said screws 57 being arranged in the internal radial adjustment ring 53 in such a way as to be adjustable in a direction radial to the centre longitudinal axis 18 while abutting against a cylindrical ring face 58 formed on the internal support ring 50. By means of a plurality of internal fastening screws 59 distributed across the periphery at equal angular distances, the internal radial adjustment ring 53 is firmly connected to the internal support ring 50 in a position selected by means of the internal radial adjustment screws 57.

The internal axial adjustment ring 54 is adjustably supported on the internal radial adjustment ring 53 in such a way that there is provided no gap therebetween, in other words it provides a seal in the direction of the centre longitudinal axis 18. It is displaced in the direction of the centre longitudinal axis 18 and locked in position by means of internal axial adjustment screws 60 distributed across the periphery as well. These internal axial adjustment screws 60 are—as can be seen from FIG. 3 as well—supported by the internal radial adjustment ring 53. By displacing the internal axial adjustment ring 54, the gap width of the internal nozzle channel 51 is changed at the internal nozzle outlet 49.

As can in particular be seen from FIG. 3 as well, the external nozzle 22 is adjustable, by means of an external nozzle adjustment device 61, both in the direction of the centre longitudinal axis 18 and in a direction radial thereto, thus allowing the gap width of the external nozzle 22 to be adjusted in the region of its external nozzle outlet 62 as well, and also with a gap width that is variable, in other words different across the periphery of the external nozzle outlet 62. To this end, an external support ring 63 is immovably attached to the external nozzle casing 29, said external support ring 63 delimiting the external nozzle channel 64, which adjoins the external melt channel 20 in the shape of a truncated cone, on the side facing radially away from the centre longitudinal axis 18, in other words to the outside. On its inside, the external nozzle channel 64 is, starting at the external melt channel 20 up to the external nozzle outlet 62, delimited by a counter ring 65 having an outer surface in the shape of a truncated cone, said counter ring 65 being immovably attached to the external nozzle mandrel 28.

On the external support ring 63, an external radial adjustment ring 66 is arranged, with an external axial adjustment ring 67 being in turn arranged thereon. The external radial adjustment ring 66 abuts, with a contact face 68 extending radially to the centre longitudinal axis 18, against a counter face 69, extending in the corresponding direction, of the external support ring 63, thus allowing the external radial adjustment ring 66 to be displaced on the external support ring 63 in a direction radial to the centre longitudinal axis 18, thus allowing the gap width of the external nozzle channel 64 to be adjusted to different extents in the region of the external radial adjustment ring 66 via the periphery of the external nozzle channel 64. An adjustment of this type is performed by means of a plurality of external radial adjustment screws 70 distributed across the periphery, said screws 57 being arranged on the external radial adjustment ring 66 in such a way as to be displaceable in a direction radial to the centre longitudinal axis 18 while abutting against a cylindrical ring face 71 formed on the external support ring 63. By means of a plurality of external fastening screws 72 distributed across the periphery at equal angular distances, the external radial adjustment ring 66 is firmly connected to the external support ring 63 in a position selected by means of the external radial adjustment screws 70.

The external axial adjustment ring 67 is adjustably supported on the external radial adjustment ring 66 in such a way that there is provided no gap therebetween, in other words it provides a seal in the direction of the centre longitudinal axis 18. It is displaced in the direction of the centre longitudinal axis 18 and locked in position by means of external axial adjustment screws 73 distributed across the periphery as well. These external axial adjustment screws 73 are—as can be seen from FIG. 3 as well—supported by the external radial adjustment ring 66. By displacing the external axial adjustment ring 67, the gap width of the external nozzle channel 64 at the external nozzle outlet 62 is changed.

As can be seen from the above, the internal nozzle adjustment device 48 and the external nozzle adjustment device 61 are freely accessible for adjustment after removing the injection head 8 from the moulding machine 6.

Naturally, the embodiments of the internal nozzle adjustment device and of the external nozzle adjustment device according to the invention can be used for other injection heads as well such as the injection head according to EP 2 116 352 B1.

What is claimed is:

1. An injection head for an apparatus for the production of a twin-wall pipe consisting of a smooth internal pipe and an external pipe welded thereto and provided with corrugations, the injection head comprising:
    an external melt channel extending concentrically to a centre longitudinal axis and leading to an external nozzle,
    an external nozzle casing delimiting the external melt channel on a side facing away from a centre longitudinal axis of the external melt channel,
    an external nozzle channel leading from the external melt channel to an external nozzle outlet of the external nozzle, said external nozzle channel expanding conically,
    an external nozzle adjustment device for radial adjustment of the external nozzle,
    an internal melt channel extending concentrically to the centre longitudinal axis and leading to an internal nozzle,
    an internal nozzle casing delimiting the internal melt channel on a side facing away from the centre longitudinal axis,
    an internal nozzle channel leading from the internal melt channel to an internal nozzle outlet of the internal nozzle, the internal nozzle channel expanding conically and having an outside, and,
    an internal nozzle adjustment device for radial adjustment of the internal nozzle,
    wherein the internal nozzle adjustment device is arranged at the internal nozzle casing and delimits the conically expanding internal nozzle channel at least partly on its outside,
    wherein the internal nozzle adjustment device has an internal radial adjustment ring that is displaceable in a direction radial to the centre longitudinal axis and delimits the conically expanding internal nozzle channel at least partly on its outside,
    wherein on the internal radial adjustment ring, an internal axial adjustment ring is arranged that is displaceable and lockable in place by internal adjustment screws, with the internal radial adjustment ring delimiting the gap width of the internal nozzle channel in the region of the internal nozzle outlet, wherein the internal axial adjustment ring is adjustably supported on the internal radial adjustment ring in such a way that there is no gap defined between the internal axial adjustment ring and the internal radial adjustment ring so as to provide a seal along a direction of the centre longitudinal axis,
    wherein the internal radial adjustment ring is radially displaceably arranged on an internal support ring, which is arranged immovably on the internal nozzle casing and which delimits the internal nozzle channel adjoining the internal melt channel in the shape of a truncated cone on the side facing radially away from the centre longitudinal axis, and
    wherein the internal radial adjustment ring and the internal support ring abut against each other in a sealing manner by faces extending radially to the centre longitudinal axis.

2. An injection head according to claim 1, wherein the external nozzle adjustment device is arranged at the external nozzle casing and delimits the conically expanding external nozzle channel at least partly on its outside.

3. An injection head according to claim 1, wherein the internal radial adjustment ring is adjustable by a plurality of radial adjustment screws distributed across its periphery and arranged radially to the centre longitudinal axis, said radial adjustment screws abutting against a ring face of the internal support ring.

4. An injection head according to claim 1, wherein the internal radial adjustment ring is firmly connectable to the internal support ring by internal fastening screws.

5. An injection head according to claim 1, wherein the external nozzle adjustment device has an external radial adjustment ring displaceable in the direction radial to the centre longitudinal axis, said radial adjustment ring delimiting the conically expanding external nozzle channel at least partly on its outside.

6. An injection head according to claim 5, wherein the external radial adjustment ring is arranged on an external support ring in such a way as to be radially displaceable, said external support ring being arranged on the external nozzle casing and delimiting the external nozzle channel adjoining the external melt channel in the shape of a truncated cone on the side facing away from the centre longitudinal axis.

7. An injection head according to claim 6, wherein the external radial adjustment ring and the external support ring abut against each other in a sealing manner by means of faces extending radially to the centre longitudinal axis.

8. An injection head according to claim 5, wherein the external radial adjustment ring is adjustable by a plurality of external radial adjustment screws distributed across its periphery and arranged radially to the centre longitudinal axis, said radial adjustment screws abutting against a ring face of the external support ring.

9. An injection head according to claim 6, wherein the external radial adjustment ring is firmly connectable to the external support ring by external fastening screws.

10. An injection head according to claim 5, wherein on the external radial adjustment ring, an external axial adjustment ring is arranged that is displaceable and lockable in place by external axial adjustment screws, with the external radial adjustment ring delimiting the gap width of the external nozzle channel in the region of the external nozzle outlet.

\* \* \* \* \*